United States Patent Office 3,791,998
Patented Feb. 12, 1974

3,791,998
PASTE TYPE ORGANOPOLYSILOXANE COMPOSITION AND FABRICS COATED THEREWITH
Carl Newton Bruns, Adrian, Mich., assignor to Stauffer Chemical Company, New York, N.Y.
No Drawing. Continuation of abandoned application Ser. No. 781,606, Dec. 5, 1968. This application July 19, 1971, Ser. No. 164,117
Int. Cl. C08g 51/04, 51/50; C08k 1/08
U.S. Cl. 260—2.5 S                9 Claims

ABSTRACT OF THE DISCLOSURE

A flowable organopolysiloxane composition comprising an organopolysiloxane polymer having a viscosity between 100,000 and 750,000 centistokes, a curing agent, a hydroxyl-terminated organopolysiloxane, and filler to form a composition having a penetrometer value of between 250 and 350. The composition may be applied to an untreated fabric and thereafter cured at an elevated temperature to form a silicone rubber impregnated fabric.

This application is a continuation application of application, Ser. No. 781,606 which was filed on Dec. 5, 1968, and which has since been abandoned.

The present invention relates to an organopolysiloxane composition, more particularly to a flowable organopolysiloxane composition which may be applied to untreated fabrics and cured to form a silicone rubber impregnated fabric.

Although curable organopolysiloxanes have many properties which make them desirable for industrial applications, they are extremely difficult to apply to various fabrics and achieve satisfactory bonding thereto. Heretofore, the curable organopolysiloxanes have been dissolved in a solvent and then applied to the fabric. However, this technique necessitated removal of the solvent prior to the vulcanization of the organopolysiloxane. In another technique, fabrics were treated with primer or adhesive compositions prior to the application of the curable organopolysiloxane composition. These primer or adhesive compositions had the disadvantage that they have a tendency to migrate to the surface when pressure is applied in the application of the heat curable organopolysiloxane composition. In addition, fabrics which have been treated with primers do not provide good day-to-day reproducibility, especially when stored for long periods of time. Also, several of the primers exhibit an extensive wicking effect which makes them undesirable in the treatment of fabrics.

It is therefore an object of this invention to provide a flowable organopolysiloxane composition. Another object of this invention is to provide a flowable organopolysilxane composition which will adhere to untreated fabrics. Still another object of this invention is to provide a curable organopolysiloxane composition which will penetrate the interstices of a fabric. A further object of this invention is to provide a method for applying a flowable organopolysiloxane composition to an untreated fabric. A still further object of this invention is to provide a silicone rubber impregnated fabric.

The foregoing objects and others which will become apparent from the following discussion are accomplished in accordance with this invention, generally speaking, by providing a flowable heat curable organopolysiloxane composition and fabric impregnated therewith. The flowable composition comprises an organopolysiloxane polymer, a curing agent, sufficient antistructure agent, and filler to form a composition having a penetrometer value between 250 and 350 (expressed in units of tenths of millimeters) after 10 seconds at 25° C.

The organopolysiloxane polymer which has a viscosity above 100,000 centistokes, preferably between 100,000 and 750,000 and more preferably between 250,000 and 400,000 centistokes, may be represented by the formula:

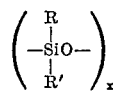

where R and R' are organic substituents selected from the class consisting of lower alkyl, lower alkenyl, and aryl radicals and $x$ is a number greater than 100. Examples of suitable alkyl groups are methyl, ethyl, propyl, butyl groups, halogen, and cyano-substituted alkyl groups containing from 1 to 4 carbon atoms; aryl groups, such as phenyl, halogenated phenyl; and lower alkenyl groups, such as vinyl and cyclohexenyl groups. Generally, the organic substituents on the organopolysiloxane are present in an average amount of between 1.75 and 2.25 organic radicals per silicon atom with at least 50 percent in number of the substituents being methyl groups and the remainder of the groups being methyl or methyl with from 5 to 20 percent phenyl or methyl with phenyl and vinyl or methyl vinyl or cyanopropyl groups, methyl vinyl and ethyl groups or methyl and trifluoropropyl groups. It is preferred that the organopolysiloxane polymer have from 0.05 to 0.35 percent and more preferably from about 0.1 to 0.2 mole percent vinyl containing groups.

The composition also contains anti-structure agents, such as hydroxyl-terminated organopolysiloxanes; organic phosphate fluids, such as tributylphosphate, tricresylphosphate; water, dibutyl phthalate, glycols, esters and the like. Preferably, the hydroxyl-terminated organopolysiloxanes have viscosities between about 40 and 100 centistokes and more preferably between 50 and 75 centistokes. All the organic radicals on the hydroxyl fluids are methyl or phenyl radicals and are present in an average amount of between 1.99 and 2.10 organic radicals per silicon atom.

The amount of anti-structure agent employed is dependent upon the viscosity of the organopolysiloxane polymer, i.e., the higher the viscosity of the organopolysiloxane polymer, the greater the amount of hydroxyl-terminated organopolysiloxane necessary in order to obtain a flowable composition. Generally, the amount of hydroxyl-terminated fluid will range from about 2 to 10 percent, preferably from about 3 to 5 percent by weight based on the weight of the organopolysiloxane polymer.

In addition to the above two components, the flowable composition contains sufficient reinforcing fillers to form a pasty mass having a penetrometer value of between 250 and 350 as determined in accordance with the procedure described in ASTM D 217–65T. Of course, the amount of filler is dependent upon the viscosity of the organopolysiloxane polymer and hydroxyl-terminated organopolysiloxane mixture. Thus, the amount of filler used in combination with the mixture of organopolysiloxanes may obviously be varied within wide limits, for example, from about 10 to 100 percent by weight of filler based on the weight of the organopolysiloxane polymer. The exact amount of filler used will depend upon such factors as the viscosity of the mixture and type of filler employed, e.g., density of the filler. Reinforcing fillers and/or non-reinforcing fillers may be used, however, it is generally preferred that the reinforcing fillers constitute a major proportion of the weight of the fillers.

Examples of fillers which may be incorporated in the composition of this invention are asbestos, clay, hydrated calcium silicate, zinc sulfide, silica aerogels, barium titanate, glass fiber, floc, iron oxide, bentonite, zinc oxide, titanium dioxide, magnesium, micronized graphite, micronized slate, micronized mica, celite, lead oxide, blue lead, alumina, either hydrated or dehydrated, calcium carbonate, sodium metasilicate, and nickelous oxide.

Various curing agents may be incorporated in the flowable organopolysiloxane composition to effect the rapid conversion of the composition to a solid elastomeric state. Among such curing agents may be mentioned, for example, benzoyl peroxide, t-butyl perbenzoate, bis(2,4-dichlorobenzoyl) peroxide, dicumyl peroxide, and etc. These curing agents ("vulcanizing accelerators" as they are often designated) may be present in amounts ranging from about 0.1 to as high as 4 to 8 percent or even more by weight based on the weight of the organopolysiloxane polymer.

In another embodiment of this invention, a cellular silicone rubber composition may be prepared by adding a blowing agent and/or a filler containing entrapped air to the flowable organopolysiloxane composition described above. Examples of suitable blowing agents which may be employed include carbon dioxide gas, nitrogen gas, ammonium gas, ammonium carbonate, sodium bicarbonate, and N,N'-dimethyl - N,N' - dinitrosoterphthalamide, N,N' - dinitrosopentamethylene tetraamine, azodicarbonamide and others, all of which are more or less soluble in the flowable composition when it is cold and is gasified when heat is applied.

Limited amounts of other additives such as pigments, oxides of iron, mercury and other heavy metals, antioxidants, and flame retardants may be incorporated in the curable silicone rubber composition of this invention in order to impart desired color or to improve a specific property, such as compression set, flame retardancy, and the like.

The flowable heat curable organopolysiloxane compositions of this invention may be applied to a variety of fabrics, such as cotton, wool, asbestos and glass fibers, as well as those containing synthetic fibers, such as nylon, Nomex and Dacron.

The manner in which the present invention may be practiced may be widely varied. For example, the composition may be mixed initially in a dough mixer and then followed by a milling step. It is preferred that the filler and hydroxyl-terminated fluid be added to the organopolysiloxane polymer and where several fillers are used, it is preferred that the material be mixed after the addition of each filler to insure adequate dispersion and thorough wetting of the filler by the organopolysiloxane polymer. The curing agent may be added either during the final addition of the filler or after the addition of the filler is complete.

The flowable heat curable organopolysiloxane composition thus prepared is applied as a sheet to an untreated fabric by any conventional technique known in the art, such as by knife coating, doctoring, and the like and then vulcanized by heating at a temperature above about 110° C. for at least 3 minutes. If desired, the vulcanized material may be held in an oven at any desired temperature up to about 250° C. for several hours.

Where it is desired to form a cellular silicone rubber impregnated fabric, a blowing agent is incorporated in the flowable composition and applied to the fabric as a sheet. The coated fabric is placed in a press between two plates, the plates being separated at a distance equal to the desired amount of thickness of the material so that the composition may expand to this extent and then heated to a temperature sufficient to cause degradation of the blowing agent, generally from about 70° to 100° C. The resulting cellular composition is then vulcanized at a temperature of about 110° C. for at least 3 minutes.

Additional curing may be employed by heating the vulcanized products in an oven at any desired temperature up to about 250° C. for several hours. This technique will result in a cellular silicone rubber having the desired thickness and at the same time will effect a secure bond between the silicone rubber and the fabric.

Heretofore, it was necessary to remove the sizing agent prior to treating the fabric with an adhesive or primer composition in order to obtain satisfactory bonding between the silicone rubber and the fabric. Furthermore, the viscosity of the curable organopolysiloxane was so high that it was necessary to employ pressure in order to obtain a satisfactory coating on the fabric. However, the composition of this invention may be applied directly to an untreated fabric in the absence of pressure and at the same time obtain improved bonding between the fabric and the silicone rubber.

Due to the flowability of this composition, it is now possible to dip flow, transfer roll, or knife coat glass, cloth, or other fabrics in the preparation of insulating materials having superior physical and electrical properties. These impregnated materials may be used to insulate various electrical products, such as conductors, e.g., copper or aluminum cores, etc., generators, motors, coils, and the like. Also, the composition may be readily applied over electrical conductors and heat treated at elevated temperatures in order to obtain a smooth coherent cured insulation having good thermal stability.

In addition, the composition described herein may be used in the manufacture of multiple layers, for instance, two-layer laminated adhesive sheet material which may be used as insulation for electrical conductors. The adhesive sheet material may be prepared by applying the composition to both surfaces of a fabric, for instance, knife coating followed by the slight application of heat to reduce the tackiness of the silicone rubber. The material is wrapped around the conductor and subjected to further vulcanization at temperatures up to about 250° C. at times varying from about 5 minutes to 3 or 4 hours to fuse the overlapping layers to form a unitary substantially void-free insulation around the conductor.

The embodiments of this invention are further illustrated by the following examples in which all parts are by weight unless otherwise specified.

EXAMPLE 1

To a dough mixer containing about 200 parts of a methyl vinyl polymer having a viscosity of about 300,000 centistokes are added about 4 parts of Cab-O-Sil and about 6 parts of hydroxyl-terminated dimethylpolysiloxane fluid at a viscosity of 50 centistokes and mixed for about 15 minutes. The resulting mixture is added to 6 parts of pyrogenic titanium dioxide and mixed for an additional 15 minutes. About 50 parts of Minusil is added to the resulting mixture and again mixed for about 30 minutes followed by the addition of 8 parts of bis(2,4-dichlorobenzoyl) peroxide and mixed for an additional 15 minutes. The compound material is removed from the dough mixer and bin aged for about 48 hours and then rolled in a three-roll mill. After storing the product for 24 hours, it exhibits a penetrometer reading of between 280 and 300 (expressed in units of tenths of millimeters) after 10 seconds at 25° C. as determined in accordance with ASTM D 217–65T.

To about 100 parts of the composition prepared above is added about 3 parts of bis(2,4-dichlorobenzoyl) peroxide and applied as a knife coating to a fabric, cured for about 10 minutes at 160° C. and then post-cured for an additional 4 hours at about 205° C. The silicone rubber exhibits good adhesion to the fabric.

EXAMPLE 2

To about 100 parts of the heat curable organopolysiloxane composition prepared in accordance with the procedure described in Example 1, are mixed about 3 parts of bis(2,4-dichlorobenzoyl) peroxide and about 5 parts of ammonium carbonate and applied to a glass fabric by knife coating. The coated fabric is heated to about 100° C. in a mold for 10 minutes and thereafter increased to a temperature of about 120° C. for 3 minutes. The material is removed from the mold and post-cured for 4 hours at a temperature of 205° C. The resulting cellular silicone rubber exhibits good adhesion to the glass fiber.

While the ratio of organopolysiloxane polymer, hydroxyl-terminated organopolysiloxane, and fillers may be varied, it is essential that the composition have a penetrometer value of between 250 and 350 in order to provide a paste-like composition suitable for impregnating fabrics.

Although specific examples of the invention have been described herein, other variations and modifications falling within the spirit and scope of the appended claims are to be included therein.

The invention claimed is:

1. A paste-like vulcanizable organopolysiloxane composition which will penetrate the interstices of a fabric when applied thereto consisting essentially of an organopolysiloxane polymer containing hydrocarbon groups and halogenated derivatives thereof and having a viscosity between 100,000 and 750,000 centistokes, an organic phosphate fluid anti-structuring agent present in an amount of from 2 to 10 percent based on the weight of the organopolysiloxane polymer, an organic peroxide curing agent and sufficient filler to provide a composition having a penetrometer value of between 250 and 350 units based on tenths of millimeters after 10 seconds at 25° C.

2. The composition of claim 1 wherein the phosphate fluid is tributyl phosphate.

3. The composition of claim 1 wherein the organopolysiloxane polymer contains recurring groups of the formula:

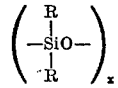

wherein R and R' are organic radicals selected from the group consisting of alkyl radicals, alkenyl radicals, aryl radicals and halo- and cyano-substituted organic radicals and $x$ is a number greater than 100.

4. The composition of claim 1 wherein the organopolysiloxane polymer has from 0.05 to 0.35 percent vinyl-containing groups.

5. The composition of claim 1 wherein the organopolysiloxane polymer contains at least 0.1 percent methyl vinyl groups.

6. The composition of claim 1 wherein the curing agent is bis-(2,4-dichlorobenzoyl) peroxide.

7. A method for coating a fabric with a paste-like vulcanizable composition which comprises applying to an unprimed fabric the composition of claim 1 vulcanizing the coated fabric at a temperature up to about 110° C. and thereafter continuing to heat the coated fabric to a temperature up to about 250° C.

8. The method of claim 7, wherein the composition contains a blowing agent and the coated fabric is vulcanized at a temperature sufficient to gasify the blowing agent and thereafter heated to a temperature up to about 250° C.

9. The composition of claim 1 wherein the organic phosphate is tricresylphosphate.

References Cited

UNITED STATES PATENTS

| | | | |
|---|---|---|---|
| 2,568,672 | 9/1951 | Warrick | 260—2.5 S |
| 2,703,775 | 3/1955 | Panagrossi et al. | 260—2.5 S |
| 2,875,163 | 2/1959 | Berridge | 260—2.5 S |
| 2,890,188 | 6/1959 | Konkle et al. | 260—37 S B |
| 2,954,357 | 9/1960 | Fekete | 260—37 S B |
| 2,983,697 | 5/1961 | Brown et al. | 260—37 S B |
| 3,238,157 | 3/1966 | Smith | 260—2.5 S |
| 3,428,580 | 2/1969 | Nitzche et al. | 260—46.5 G |

PAUL LIEBERMAN, Primary Examiner

M. FOELAK, Assistant Examiner

U.S. Cl. X.R.

117—138.8 A, 161 ZA, 232; 260—29.2 M, 30.6 S B, 31.8 S, 37 S B, 37 M, 46.5 G